United States Patent
Koiwa et al.

(10) Patent No.: US 6,859,365 B2
(45) Date of Patent: Feb. 22, 2005

(54) DISPLAY UNIT AND MOBILE APPARATUS USING THE UNIT

(75) Inventors: Kaoru Koiwa, Tokyo (JP); Hiroyuki Hasebe, Chigasaki (JP); Asako Satoh, Yokohama (JP); Jun Momma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 10/083,386

(22) Filed: Feb. 27, 2002

(65) Prior Publication Data

US 2002/0118333 A1 Aug. 29, 2002

(30) Foreign Application Priority Data

Feb. 28, 2001 (JP) ........................................ 2001-056025

(51) Int. Cl.[7] ................................................. G06F 1/16
(52) U.S. Cl. ...................... 361/687; 361/683; 361/680; 361/689; 315/169.3; 349/64
(58) Field of Search ................................ 361/681, 683, 361/686, 687; 349/61, 64, 65, 68, 74, 116; 345/211, 212; 368/242; 968/931; 359/48, 53, 69, 49, 72; 315/169.1–169.6; 313/495–497, 308–310, 518

(56) References Cited

U.S. PATENT DOCUMENTS 5,742,367 A * 4/1998 Kozaki ........................ 349/64
6,469,449 B1 * 10/2002 Leung et al. ............ 315/169.3

FOREIGN PATENT DOCUMENTS

| EP | 0 905 603 | 3/1999 | |
|---|---|---|---|
| JP | 60-84771 | 5/1985 | |
| JP | 405204494 A | * 8/1993 | ............. G06F/1/26 |
| JP | 407225380 A | * 8/1995 | ......... G02F/1/1335 |
| JP | 02000075804 A | * 3/2000 | ............. G09F/9/00 |
| JP | 02000148297 A | * 5/2000 | ............. G06F/1/16 |
| JP | 2000-215864 | 8/2000 | |
| JP | 02001086206 A | * 3/2001 | ............. H04M/1/02 |
| WO | WO 00/46656 | 8/2000 | |

* cited by examiner

*Primary Examiner*—Michael Datskovsky
(74) *Attorney, Agent, or Firm*—Oblon, Spivak, McClelland, Maier & Neustadt, P.C.

(57) ABSTRACT

The display unit comprises a display device such as liquid crystal cell or the like; and a secondary battery disposed to a rear side of the display device. A heat shielding layer having a thermal conductivity of at most 5 W/mK, preferably at most 1 W/mK is formed as a heat shielding plate between the display device and the secondary battery, and the display device and the secondary battery are integrally assembled to form a module structure. According to the above structure of the present invention, since the display device such as liquid crystal cell or the like and the secondary battery are integrally assembled to form a module structure, the display unit can be made compact and thin to attain a light weight.

11 Claims, 7 Drawing Sheets

DISPLAY UNIT AND MOBILE APPARATUS USING THE UNIT

BACKGROUND OF THE INVENTION

1. Field of the Invention

The present invention relates to a display unit to be provided for mobile apparatuses such as a portable telephone, a notebook-sized personal computer (PC), a mobile information terminal device or the like, more particularly to a display unit and a mobile apparatus using the display unit, and more particularly to a display unit in which a display device and a thin secondary battery are integrally combined to form a module structure, and to a mobile apparatus into which the display device is assembled.

2. Description of the Related Art

As the mobile apparatuses such as the portable telephone, notebook-sized personal computer (PC) or the like have rapidly become popular, a miniaturization of the mobile apparatuses has been advanced, so that there is a tendency that parts to be assembled are made compact and the parts are replaced by semiconductor elements, while a size of a display device as a liquid crystal cell has been enlarged in view of legibleness and clear observation for the display device.

Further, as the mobile apparatuses have rapidly become popular, a demand for secondary battery as a power source for the apparatus has also been rapidly increased. To make the second battery compact and thin in thickness and to have a light weight and high capacity has been also demanded, and the thin-type secondary batteries have been developed for realizing the compactness and light weight of the mobile apparatuses.

In particular, the mobile apparatuses are strongly demanded to be made compact and thin in thickness in view of good portability (mobility) in addition to an improvement in functions thereof, so that the secondary battery as unit power source is also demanded to be made to have thin size, light weight and long-life characteristic. While, the display device is demanded to enlarge the display screen in view of legibleness even if the entire mobile apparatus is made compact to have the light weight.

In accordance with that the mobile apparatuses are made compact to have the light weight, the display device provided to the mobile apparatus is also required to be made compact and thin to have light weight. However, the display screen of the display device is required to enlarge a size of the display screen in view of legibleness. On the other hand, it has been known that the display device to be assembled into the display unit has a weak resistance to heat or stress due to display materials such as liquid crystal or the like and structural factors of the display device.

In addition, the secondary battery assembled into the mobile apparatus causes a heat generation during the charging/discharging operations.

Therefore, the display device and the secondary battery mutually have characteristics exactly opposing to each other. In this regard, it has been generally considered to be difficult to combine the display device with the secondary battery so as to integrate each other for the purpose of making the mobile apparatus compact to obtain a light weight i.e., for the purpose of making the display device compact and thin to provide light weight.

In actual, the display device such as liquid crystal cell or the like is weak against heat or stress, and the function of the liquid crystal material is greatly lowered by the heat generated during the charging/discharging operation of the secondary battery, so that there has been posed a problem that the displaying function of the display device is damaged and lost.

SUMMARY OF THE INVENTION

The present invention had been achieved for solving the aforementioned problems. Accordingly, a main object of the present invention is to provide a display unit and a mobile apparatus in which heat conduction from the secondary battery is shut off, and the display unit and the secondary battery are integrally formed so as to reduce a size, weight and thickness of an entire unit, and capable of maintaining a good displaying function for a long period of time.

Another object of the present invention is to provide a display unit in which the display unit and the secondary battery are integrally formed and the heat conduction from the secondary battery is shut off thereby to positively cool the secondary battery so as to maintain and improve the function of the display unit and to reduce the size, weight and thickness of the display unit.

Further object of the present invention is to provide a display unit and a mobile apparatus in which a heat shielding layer is disposed between the display unit and the secondary battery to increase mechanical strength and physical strength of the display unit as a structural body.

Still further object of the present invention is to provide a display unit and a mobile apparatus in which the secondary battery is provided with a shock-absorbing function so as to impart a high impact resistance to the unit and apparatus even if the size, weight and thickness of the unit or the apparatus are reduced.

Further, an additional object of the present invention is to provide a display unit in which the display unit and the secondary battery are integrally formed, so that the mobile apparatus can be made to be compact so as to reduce the weight thereof.

In order to solve the problems and to attain the objects described above, in a main aspect of the present invention, there is provided a display unit comprising: a display device having a display screen; a secondary battery disposed to a rear side of the display device; and a heat shielding layer interposed between the display device and the secondary battery, the heat shielding layer having a thermal conductivity of at most 5 W/mK; wherein the display device and the secondary battery are integrally assembled to form a module structure.

In another aspect of the present invention, there is provided a display unit comprising: a display device having a display screen; a secondary battery disposed to a rear side of the display device; and a heat shielding layer interposed between the display device and the secondary battery, the heat shielding layer having a thermal conductivity of at most 5 W/mK; and a heat radiating layer or a cooling layer disposed to the secondary battery at a side opposing to a side of the display device; wherein the display device and the secondary battery are integrally assembled to form a module structure.

In further aspect of the present invention, there is provided a display unit comprising: a display device having a display screen; a secondary battery disposed to a rear side of the display device; a heat shielding layer interposed between the display device and the secondary battery, the heat shielding layer having a thermal conductivity of at most 5 W/mK; and a heat radiating layer or a cooling layer laminated with the heat shielding layer to form a laminar shape; wherein the display device and the secondary battery are integrally assembled to form a module structure.

In still further aspect of the present invention, there is provided a display unit comprising: a display device having a display screen; a secondary battery disposed to a rear side of the display device; a heat shielding layer interposed between the display device and the secondary battery, the heat shielding layer having a thermal conductivity of at most 5 W/mK; and a heat radiating layer or a cooling layer laminated with the heat shielding layer to form a laminar shape; and another heat radiating layer or another cooling layer provided to the secondary battery at a side opposing to a side of the display device; wherein the display device and the secondary battery are integrally assembled to form a module structure.

In additional aspect of the present invention, there is provided a display unit comprising: a display device having a display screen; and a secondary battery disposed to a rear side of the display device; wherein the display device and the secondary battery are integrally adhered by means of a double coated adhesive tape as a heat shielding layer having a thermal conductivity of at most 5 W/mK, thereby to form a module structure.

Further, in the above display unit according to the present invention, it is preferable that the secondary battery is constituted by at least one of thin lithium ion secondary battery and thin nickel metal hydride secondary battery.

Furthermore, the present invention provides a mobile apparatus comprising: a display unit as defined in the present invention; and a portable unit into which the display unit is integrally assembled.

Further, in the above mobile apparatus according to the present invention, it is preferable that the portable unit comprises a unit body and a cover body connected to the unit body through a hinge so that the cover body is openable, and the display device is mounted on the cover body while the secondary battery is a rod-shaped secondary battery detachably incorporated in the hinge.

BRIEF DESCRIPTION OF THE DRAWINGS

Other objects and aspects of the present invention will become more apparent from the following description of embodiments with reference to the accompanying drawings in which.

DETAILED DESCRIPTION OF THE PREFERRED EMBODIMENTS

Next, preferred embodiments of the display device according to the present invention will be explained more concretely with reference to the accompanying drawings.

Figure 1:
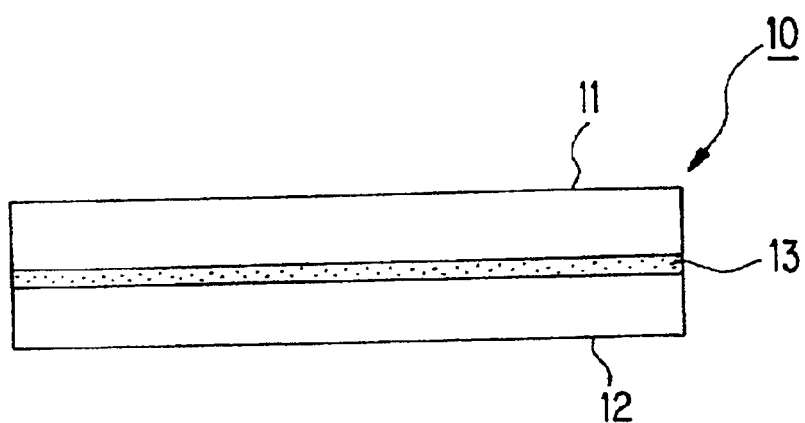
FIG. 1 is a basic principle view showing a display unit according to a first embodiment of the present invention.

FIG. 1 is a basic principle view showing a display unit 10 according to a first embodiment of the present invention.

The display unit 10 is provided for mobile apparatuses such as notebook-type personal computer (notebook-sized and thin-type personal computer), portable telephone (cellular phone), portable television (TV) image receiver, portable navigation device, mobile information terminal device, electronic pocket book and electronic dictionary or the like. The display unit 10 is accommodated in a thin box-shaped body case, and the display unit 10 is formed by integrally combining a display device 11 as a liquid crystal cell to a rectangular-thin-type secondary battery 12 as a power source thereby to form a module structure.

The display unit 10 is formed to provide the module structure in which the display device 11 having a plate-shaped cell structure and the thin-type secondary battery 12 are integrally assembled. As a thin-type secondary battery 12, thin-type prismatic secondary battery 12 having a rectangular-shape is used.

As shown in FIG. 1, in the display unit 10, the display device 11 and the thin-type prismatic secondary battery 12 as the power source for the device are integrally formed through a heat shielding plate 13 as a heat shielding layer thereby to provide a module structure, so that the display device 10 becomes a display module having a sandwich-structure.

The display device 11 is not particularly limited as far as the device 11 has an image displaying function as the liquid crystal cell (LCC) or the like. However, in a case where the liquid crystal cell to be easily affected by heat-application is used, the effects of the present invention can be further effectively attained.

The heat shielding plate 13 is formed of a material having a small thermal conductivity of at most 5 W/mK, preferably at most 1 W/mK. The heat shielding plate 13 is formed from resin material, metal composite material or metal material so as to obtain a thickness of about 100 μm to several mm, preferably a thickness range from 100–200 μm to about 1 mm.

In particular, as the material for constituting the heat shielding plate 13, it is preferable to use synthetic resin materials such as methacrylic resin, polyphenylene oxide, polyethylene resin, epoxy resin, phenol resin, synthetic rubber or the like each having a thermal conductivity of at most 1 W/mK.

According to the display unit 10, since the display device 11 and the secondary battery are integrally combined through the heat shielding plate 13, it becomes possible to reduce the size, weight and thickness of the display unit 10. Further, in a case where the liquid crystal cell having a poor resistance to heat or stress is used, it becomes possible reinforce the display device 11 by the secondary battery 12 and the heat shielding plate 13 so as to increase rigidity of the device, so that the mechanical strength and the physical strength the display device 11 can be improved.

An upper limit of a heat resistance of the liquid crystal cell (LCC) is about 45° C. under a present liquid crystal technology. When the temperature exceeds the above upper limit, color-irregularities and distortion or the like are revealed on the display screen of the display device 11 using the liquid crystal cell, so that adverse effects due to the high temperature are presented.

As the thin-type secondary battery 12, there can be used polymer lithium ion battery using a gel-type polymer and having a battery thickness of about 0.5–10 mm, or thin-type lithium ion battery, secondary battery, nickel metal hydride secondary battery each using a liquid electrolyte. Further, as the thin-type secondary battery 12, for example, there can be also used an extremely thin-type lithium ion secondary battery or the like having a battery thickness of about 0.5–4 mm, light weight and a high discharging capacity of 650 mAh or more.

On the other hand, the secondary battery 12 causes a heat generation during the charging/discharging operations. Due to the heat generation during the charging operation of the battery, the temperature of the secondary battery 12 is raised to a temperature level several degrees, for example, about 5° C. higher than that of the ambient atmosphere.

According to the display unit 10 shown in FIG. 1, the display device 11 as liquid crystal cell and the thin-type secondary battery 12 are integrally combined through the heat shielding plate 13 having a thermal conductivity of at most 5 W/mK thereby to form a module structure constituting a liquid crystal displaying module. Therefore, a temperature rise of the thin-type secondary battery 12 during the charging/discharging operations can be suppressed to a level lower than a withstand temperature of the display device 11, so that it becomes possible to effectively prevent the color-irregularities and distortion for occurring on the display screen due to the high temperature.

Figure 2:
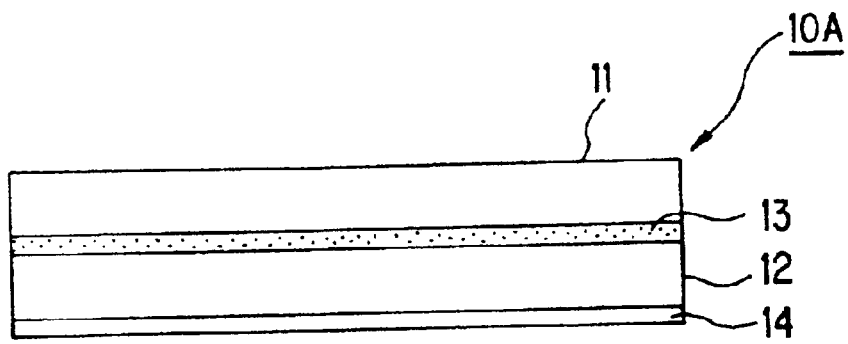
FIG. 2 is a basic principle view showing a display unit according to a second embodiment of the present invention.

FIG. 2 is a basic principle view showing a display unit 10A according to a second embodiment of the present invention.

This second embodiment is a display unit 10A prepared in such a manner that a thin-type secondary battery 12 is provided to a rear side of the display unit 10 shown in FIG. 1, while a heat radiating plate 14 as a heat radiating layer is provided to a back surface side of the secondary battery 12 thereby to form a module structure. The heat radiating plate 14 is provided to the secondary battery 12 at a side opposing to a side of the heat shielding plate 13. The basic arrangements or parts of the display unit 10A are substantially the same as those of the display unit 10 shown in FIG. 1, so that these elements or parts are not described herein by adding the same reference numerals to the corresponding elements or parts.

The heat radiating plate 14 of the display unit 10A has a thickness of about 100 ηm to several mm, and preferably formed to have a thickness of 100–200 ηm to 2 mm. The heat radiating plate 14 is formed from light metal or light metal alloy materials such as aluminum material or the like having a high thermal conductivity and a light weight. The heat radiating plate 14 can be also formed from metal materials such as copper and silver or the like. In order to secure a sufficient heat radiating area, a surface of the heat radiating plate 14 may be formed to irregular shape or formed with fins.

Further, a cooling plate can be also provided in place of the heat radiating plate 14. As the cooling plate, for example, there can be also used a plate-shape cooling layer which is prepared by combining different metals utilizing Peltier effect. The heat generated from the secondary battery 12 due to current-conduction is positively absorbed thereby to effectively cool the secondary battery 12.

This display unit 10A is constituted in such a manner that the heat radiating plate 14 or the cooling plate is provided to the rear side of the thin-type secondary battery 12 in addition to the module structure of the display unit 10 shown in FIG.1, thereby to constitute a liquid crystal displaying module structure. Therefore, the generated heat from the secondary battery 12 is discharged by the heat radiating plate 14, or absorbed by the cooling plate thereby to cool the battery, so that adverse effects of heat generation caused by charging/discharging operation of the secondary battery 12 would not be exerted on the display device 11.

In the display unit 10A shown in FIG. 2, a heat shielding function of the heat shielding plate 13 is used together with a heat radiating function of the heat radiating plate 14 or a cooling function of the cooling plate, so that the adverse effects of heat generation from the secondary battery 12 would not be exerted on the display device 11.

Figure 3:
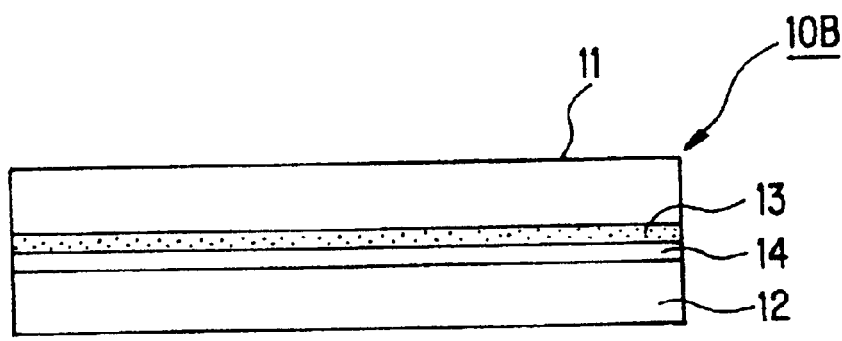
FIG. 3 is a basic principle view showing a display unit according to a third embodiment of the present invention.

FIG. 3 is a basic principle view showing a display unit 10B according to a third embodiment of the present invention.

In the display unit 10B shown in FIG. 3, for example, a plate-shaped display device 11 as an array substrate or a liquid crystal cell, thin-type secondary battery 12 as a power source, a heat shielding plate 13 as a heat shielding layer and a heat radiating plate 14 as a heat radiating layer are integrally superposed into a laminar shape thereby to form a module structure in which the heat shielding plate 13 and the heat radiating plate 14 are disposed between the display device 11 and the secondary battery 12. The display unit 10B is constituted in such a manner that the heat shielding plate 13 is provided to a side of the display device 11 while the heat radiating plate 14 is provided to a side of the secondary battery 12 thereby to form a liquid crystal display module having a sandwich-structure.

The heat shielding plate 13 and the heat radiating plate 14 are superposed to form a superposed layer, then the superposed layer is integrally combined with the display device 11 or the secondary battery 12. In this regard, a thickness of the superposed layer is set to several mm or less, preferably to 1 mm or less. More concretely to say, the heat shielding plate 13 and the heat radiating plate 14 are formed to provide a plate thickness of 100 μm to about 200 μm.

In also this display unit 10B, due to a cooperative function of the heat shielding plate 13 and the heat radiating plate 14, it becomes possible to prevent the heat generated from the secondary battery 12 from exerting on the display device 11.

In this connection, the display unit 10B can be also formed by using a cooling plate for forming a cooling layer in place of the heat radiating plate 14. A cooling plate for performing a cooling function by utilizing Peltier effect can be also used as the cooling plate.

Figure 4:
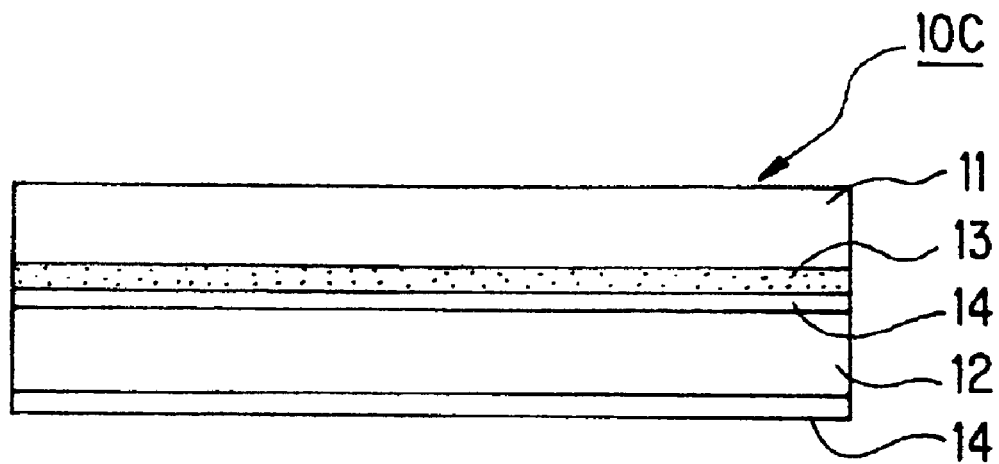
FIG. 4 is a basic principle view showing a display unit according to a fourth embodiment of the present invention.

FIG. 4 is a basic principle view showing a display unit according to a fourth embodiment of the present invention.

This display unit 10C shown in FIG. 4 is constituted by integrally providing a heat radiating plate 14 or a cooling plate to the rear side of the display unit 10B shown in FIG.3.

In this display unit 10C, the heat generated from the secondary battery 12 is positively discharged by the heat radiating plate 14, or absorbed by the cooling plate provided to both surfaces of the secondary battery, so that it becomes possible to effectively and positively prevent the adverse influences of the heat generation caused by the secondary battery 12 from exerting on a side of the display device 11.

Figure 5:
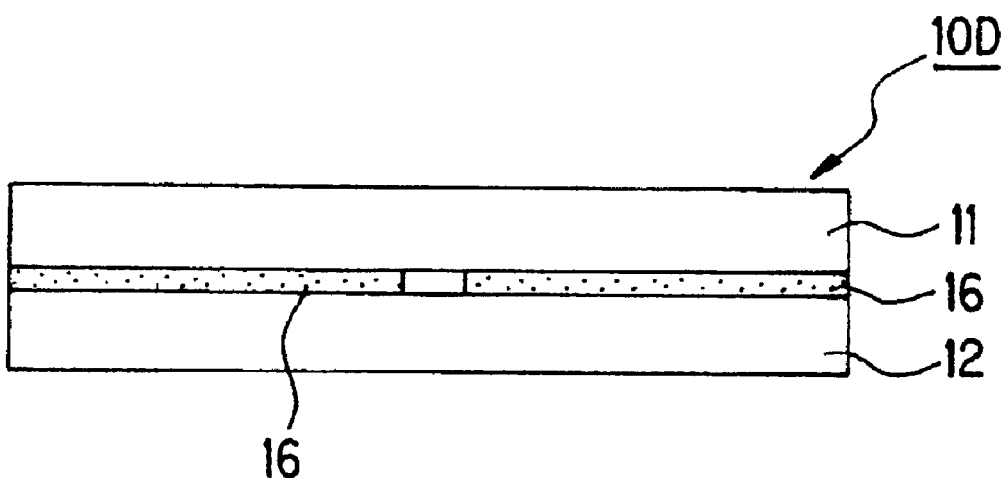
FIG. 5 is a basic principle view showing a display unit according to a fifth embodiment of the present invention.

FIG. 5 is a basic principle view showing a display unit according to a fifth embodiment of the present invention.

The display unit 10D shown in FIG. 5 is constituted by comprising: a plate-shaped display device 11 as an array substrate or a liquid crystal cell; thin-type secondary battery 12 as a power source; and double-coated adhesive tapes 16, 16, where in the display device 11 and the secondary battery 12 are integrally combined and fixed through the double-coated adhesive tapes. The double-coated adhesive tapes 16, 16 are formed of synthetic resin material having a thermal conductivity of at most 1 W/mK, and form heat shielding sheets as heat shielding layers. The thickness of the double-coated adhesive tapes 16, 16 is set to about 100 $\mu$m to about 1 mm, preferably to 100 $\mu$m to 200 $\mu$m.

Next, concrete embodiments of the display unit according to the present invention will be explained hereunder with reference to FIG. 6 or after.

Figure 6:
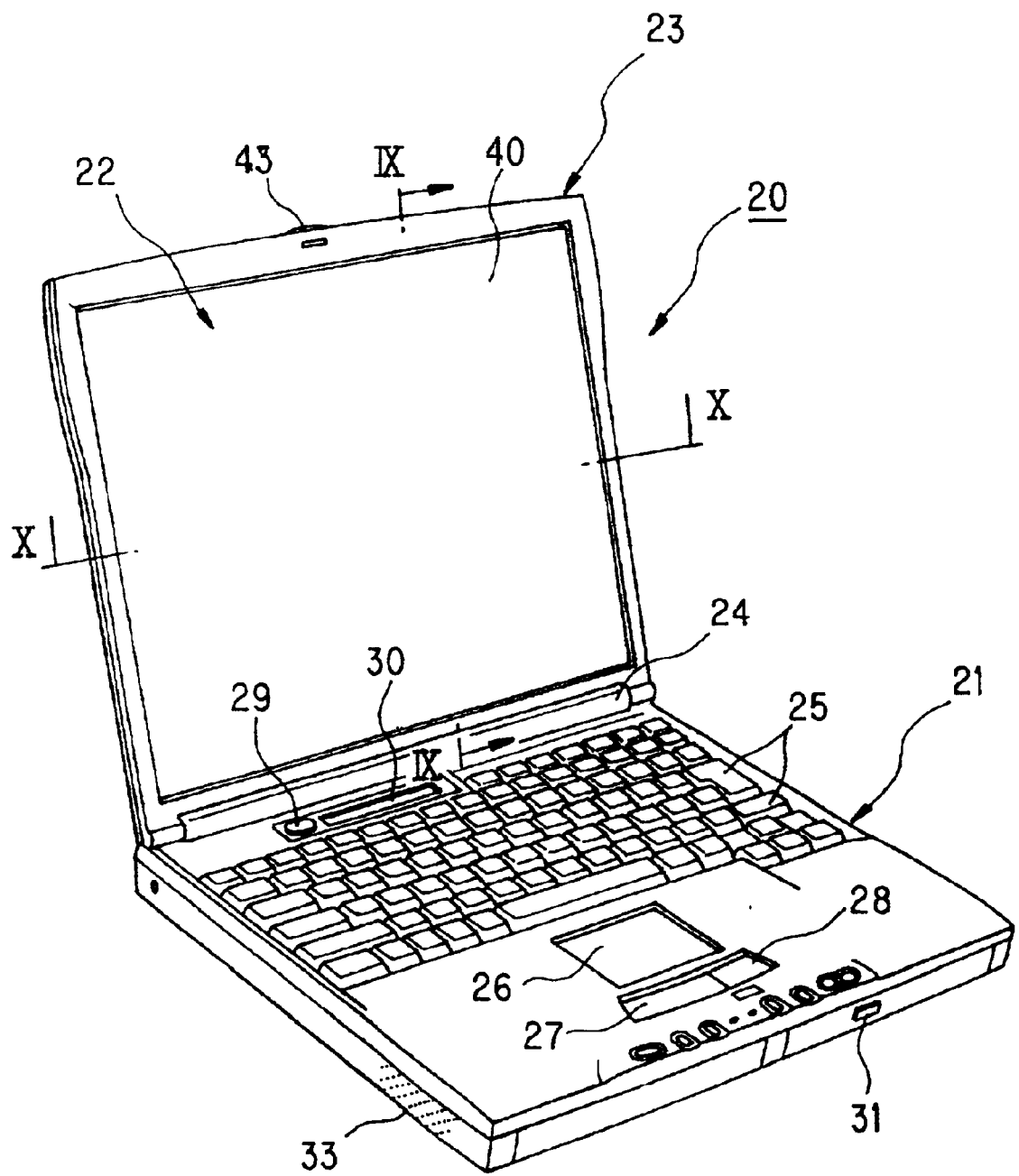
FIG. 6 is a perspective view showing an applied example in which a display unit according to the present invention is assembled into a notebook-sized personal computer (PC).
Figure 7:
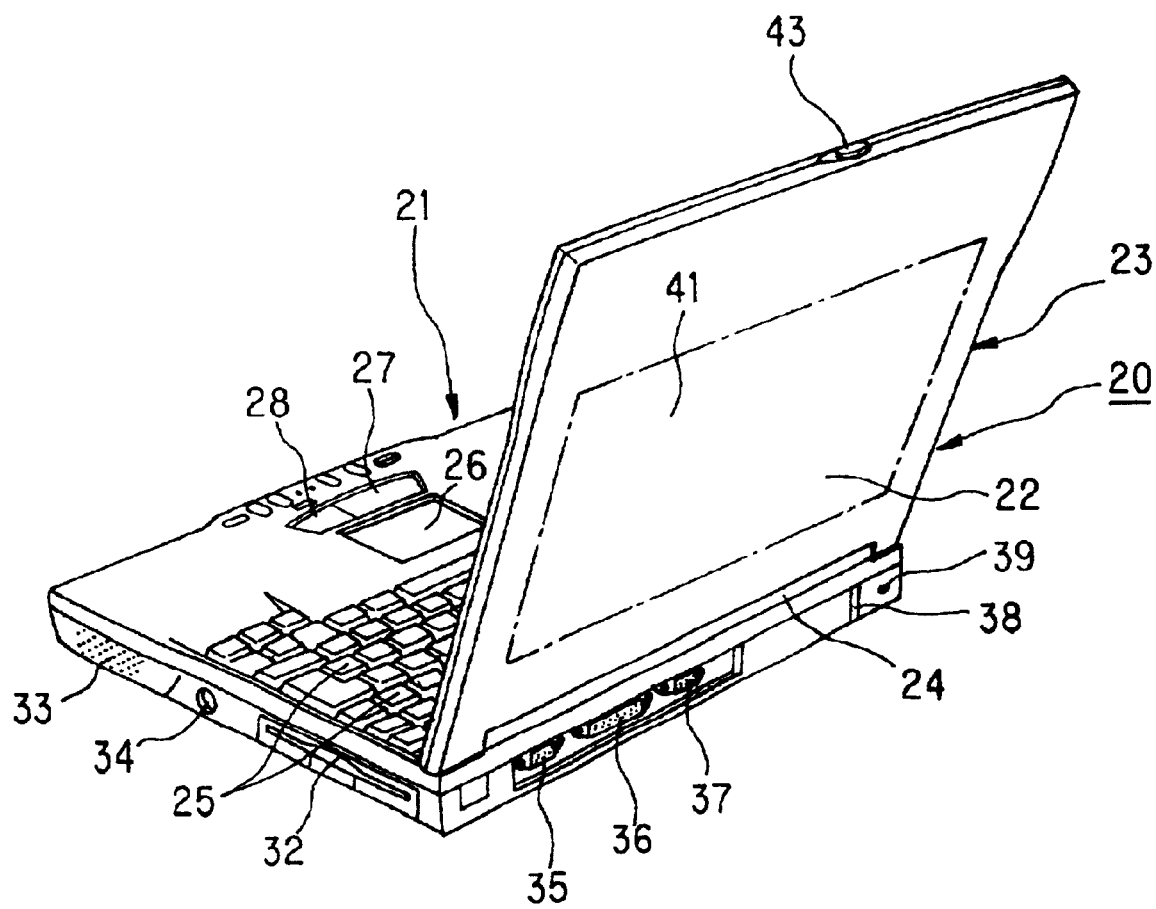
FIG. 7 is a perspective view as viewed from a rear side of the notebook-sized personal computer shown in FIG. 6 in a state where the display unit is opened.

FIGS. 6 and 7 show concrete embodiments of notebook-type personal computer (which is an abbreviation for a thin notebook-sized personal computer) 20 to which the display unit according to the present invention is applied.

In the above notebook-type personal computer (PC) 20, a display unit (liquid crystal display) 22 is mounted on a cover body 23, and the cover body 23 is connected to a personal computer body (PC body) 21 through a hinge 24 so that the cover body 23 is openable around the hinge 24.

Main parts such as CPU, processor, memories or the like are built within the PC body 21, while a key board 21, a touch pad 26 having an equivalent function to a mouse as a pointing device, a right button 27 and a left button 28 each having the same functions of those of the mouse are arranged on the PC body 21. In addition, a power switch 29 and a lid switch 30 are also arranged on the PC body 21. The lid switch 30 is a switch for detecting whether the liquid crystal display is opened or closed.

At a front surface side of the PC body 21 is provided with a CD-ROM device or CD-RW device 31, while at a side surface side is provided with a floppy disc drive unit 32, speaker 33, a mouse-key board connector 34 or the like. Further, at a rear surface side of the PC body 21 is provided with a serial connector 35, a parallel connector 36, a display connector 37, a USB connector 38, a power source connector 39 or the like.

On the other hand, the cover body 23 connected to the PC body 21 so as to be openable is provided with the display unit 22 constituting the liquid crystal display. As shown in FIGS. 6 and 7, this display unit 22 comprises: a display device 40 as liquid crystal display or the liquid crystal cell; and a thin prismatic type secondary battery 41 provided to a rear side of the display device 40, wherein the display device 40 and the secondary battery 41 are integrally combined to form a module structure. A reference numeral 43 denotes a display opening/closing latch.

Figure 8:
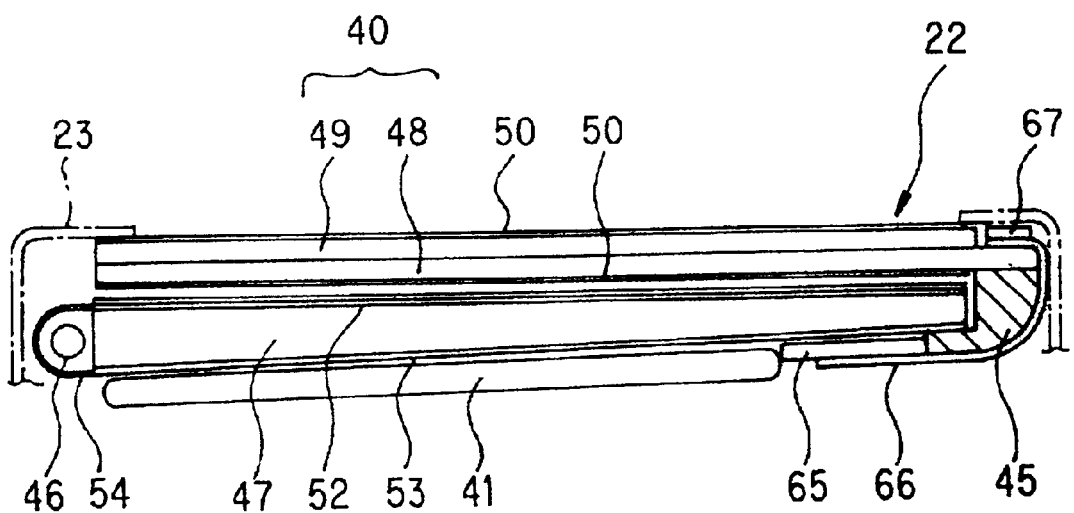
FIG. 8 is a cross sectional view, taken along the line IX—IX of FIG. 6, showing a display unit according to the present invention to be assembled into the notebook-sized personal computer shown in FIG. 6.
Figure 9:
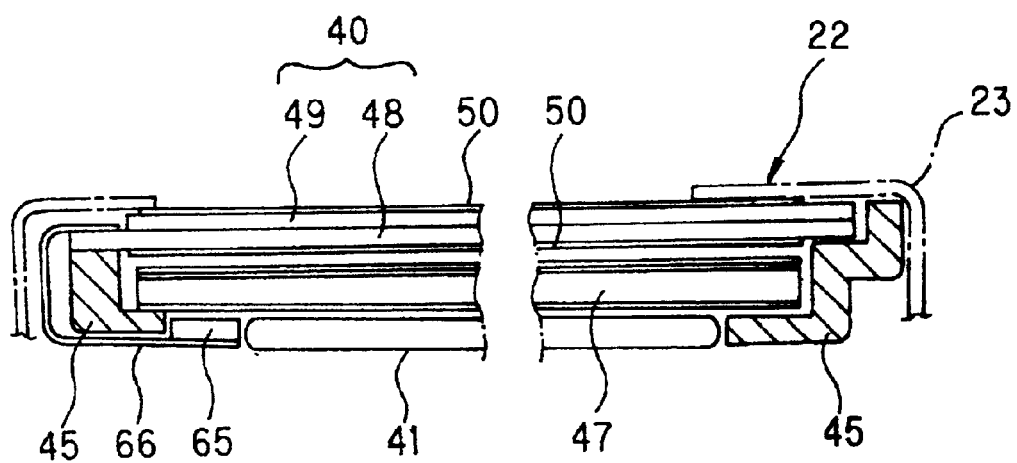
FIG. 9 is a cross sectional view, taken along the line X—X of FIG. 6, showing a display unit according to the present invention to be assembled into the notebook-sized personal computer shown in FIG. 6.

The display unit 22 is formed to provide a liquid crystal display module structure, and is held by a metal frame 45 composed of aluminum or the like as shown in FIGS. 8 and 9. The thin prismatic type secondary battery 41 is integrally provided and assembled into the liquid crystal display module. This display unit 22 is a liquid crystal transmission type display unit formed by integrally comprising: a plate-shaped liquid crystal display device 40; a linear or tubular light source 46 such as fluorescent tube or the like as a back light; a light guiding plate 47 for guiding a light from the light source 46 and the thin prismatic type secondary battery 41 thereby to provide a module structure.

The liquid crystal display device 40 is a liquid crystal cell (LCC) formed by combining a thin plate-shaped array substrate 48 with an opposing substrate 49, thus constituting a transmission type liquid crystal display body. A light polarizing plate 50 is provided to both surfaces of the liquid crystal display device 40. The light polarizing plate 50 is composed of a thin film shaped light polarizer having a thickness of about 100 $\mu$m to 200 $\mu$m.

The light guiding plate 47 is provided to a rear side of the liquid crystal display device 40 so as to oppose the device 40, and an optical diffusion sheet 52 having a multi-layered structure is provided to the light guiding plate 47 at a side of the liquid crystal display device 40 while the other side is provided with a reflection sheet 53, respectively. The optical diffusion sheet 52 is a light-transmitting sheet for diffusing or scattering the light thereby to realize to a uniformity in light amount of display screen. The optical diffusion sheet 52 is used in a form where at least two sheets are superposed. The optical diffusion sheet 52 and the reflection sheet 53 are formed so as to have a thickness of about 100 $\mu$m or less.

In addition, the light guiding plate 47 has a thickness of about 2–3 mm at a side of the tubular light source 46, while the other side of the light guiding plate 47 has a thickness of about 0.5–1.5 mm. That is, the light guiding plate 47 is formed to provide a tapered-shape such that the thickness of the plate 47 is gradually decreased in a direction apart from the tubular light source 46. The light emitted from the tubular light source 46 is reflected by a reflector 54, then guided into the light guiding plate 47.

The aforementioned light guiding plate 47 and the reflection sheet 53 are heat-shielding plates constituting the heat shielding layers, and formed of synthetic resin, metal material, metal composite material or the like having a thermal conductivity of at most 5 W/mK. The light guiding plate 47 and the reflection sheet 53 are preferably formed of material having a thermal conductivity of at most 1 W/mK.

More concretely to say, the light guiding plate 47 is formed of methacryl resin or polyphenylene oxide having a thermal conductivity of about 0.2 W/mK, polyethylene resin having a thermal conductivity of about 0.5 W/mK, epoxy resin having a thermal conductivity of about 0.8 W/mK, phenol resin having a thermal conductivity of about 0.9 W/mK, or the like. The light guiding plate 47 can be also formed of resin materials such as rubber or the like. The reflection sheet 53 is also formed of material having a thermal conductivity of at most 1 W/mK as is similar as the light guiding plate 47.

The thin prismatic type secondary battery 41 is provided to a rear side of the light guiding plate 47 as the heat shielding plate. As this secondary battery 41, for example, a lithium ion secondary battery having a high energy density, a high operation voltage and a light-weight is preferably used. In order to avoid causing a waste space in the display unit 22, an ultra-thin type lithium ion secondary battery having a thickness of at most 8 mm, preferably about 0.5–4 mm, more preferably about 0.5–2 mm is used. In FIG. 7, although the secondary battery 41 is shown by an imaginary line for explanation so as to be visible from outside the cover body 23, the secondary battery 41 is arranged in the cover body 23.

Examples of the thin-type secondary battery 41 may include: polymer type lithium ion battery (PLB) using a gel-type polymer as an electrolyte; thin-type lithium ion secondary battery and nickel metal hydride secondary battery using a liquid electrolyte; or the like. A metal can or a flexible container composed of aluminum-laminated film having a thickness of about 100 μm is used as a battery case 56 for the prismatic secondary battery 22.

Figure 10:
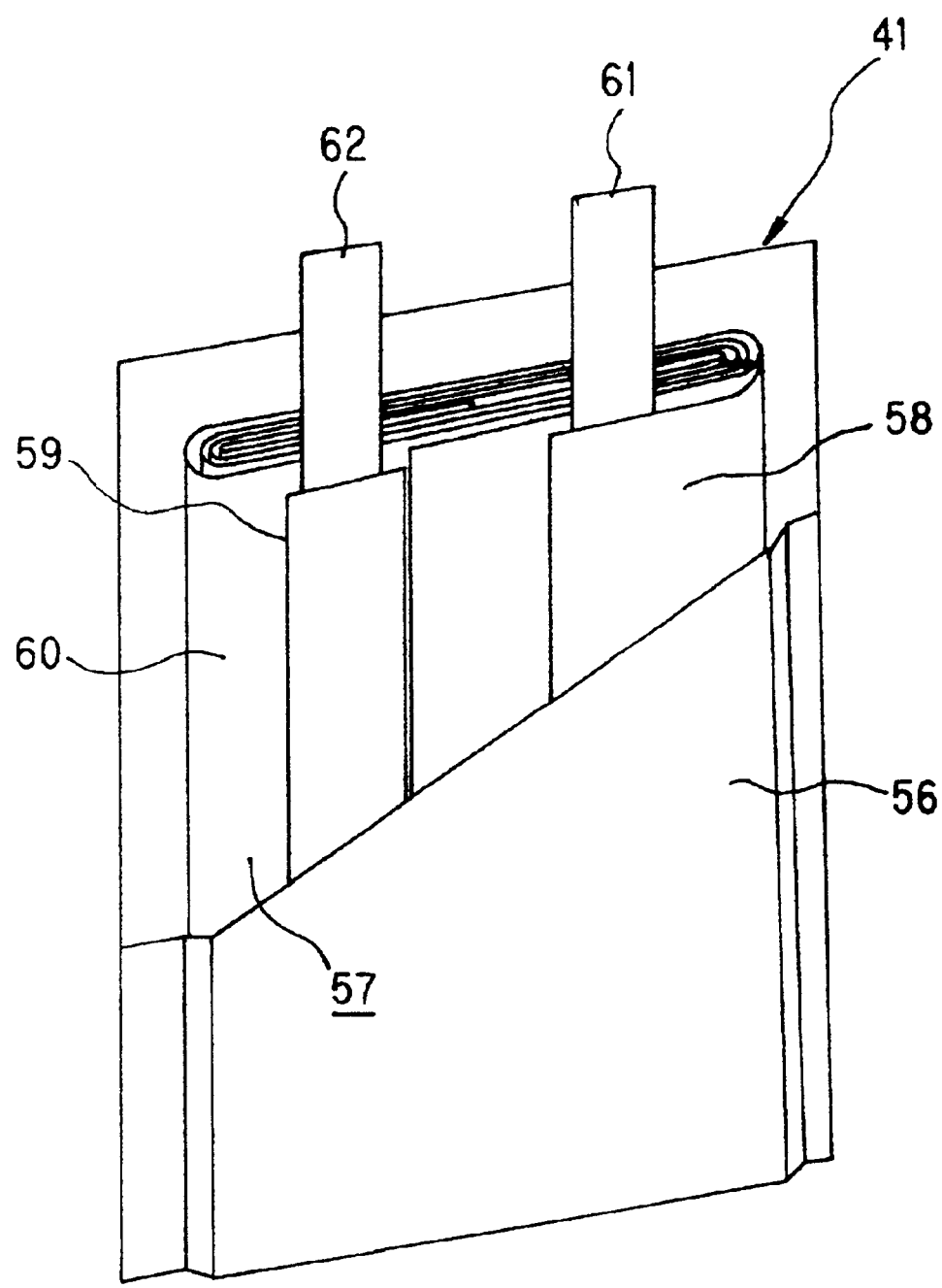
FIG. 10 is a perspective view showing an internal structure of a lithium ion prismatic secondary battery (thin-type prismatic secondary battery) composed of an aluminum-laminated film to be assembled into the display unit according to the present invention.

FIG. 10 shows an example of a thin-type lithium ion battery in which the battery case 56 composed of aluminum-laminated film is used for the thin-type secondary battery 41.

In this thin-type lithium ion secondary battery 41, a liquid-type electrolyte 57 is encapsulated into the battery case 56 composed of aluminum-laminated film. In addition, electrodes are accommodated into the battery case 56. The electrodes are formed such that a positive electrode 58 composed of lithium cobalt oxide ($LiCoO_2$) and a negative electrode 59 composed of carbon fibers are laminated through a film-shaped (sheet-shaped) separator 60 to form a laminated body, then the laminated body is wound to form the electrodes having a spiral structure. A thickness of the lithium ion secondary battery 41 can be controlled to be 10 mm or less by changing the winding number of the electrodes comprising the positive electrode 58 and the negative electrode 59 constituting the electrodes of the lithium ion secondary battery 41. In accordance with the winding number of the electrodes, it is also possible to realize a battery thickness of about 0.5–4 mm. Further, a reference numeral 61 denotes a positive electrode terminal while a reference numeral 62 denotes a negative electrode terminal.

This lithium ion secondary battery 41 has a high thermal stability even if the liquid electrolyte 57 is used. In addition, a vapor pressure of the liquid electrolyte 57 is extremely high even in a high temperature ambient. Therefore, the battery 41 would not swell even if the battery 41 is repeatedly subjected to the charging/discharging operations or operated in a high temperature ambient. In particular, the lithium ion secondary battery 41 can be maintained to be thin, and can realize an extremely thin battery having a thickness of about 0.5–2 mm. The thickness of the battery 41 can be freely designed.

As described above, the liquid crystal display device 40 as the liquid crystal cell and the thin-type secondary battery 41 are integrally combined through the light guiding plate 47 and the heat shielding plate as the reflection sheet 53 thereby to form the display unit 22 having the module structure, so that it is possible to reduce the size and weight of the display unit 22.

Although FIGS. 8 and 9 show the examples in which the dimension in a thickness direction of the display unit 22 is enlarged, an entire thickness of the display unit 22 having the liquid crystal display module structure can be reduced to be several mm. Further, when the display unit 22 is held by a frame 45, a thin-type cover body 23 for the notebook-sized personal computer can be constituted.

The liquid crystal display device 40 of the display unit 22 has a liquid crystal cell structure having a weak resistance to heat or stress. However, when the heat shielding plates 47, 53 and the thin-type secondary battery 41 are integrally assembled into the display unit 22 thereby to form the liquid crystal display module, the rigidity of the display unit 22 can be increased, and mechanical strength and physical strength can be greatly improved.

In the display unit 22, the liquid crystal display device 40 as the liquid crystal cell and the thin-type secondary battery 41 are integrally combined through the heat shielding plates (the light guiding plate 47 and the reflection sheet 53) thereby to form the display unit 22 having the module structure, so that it is possible to reduce the thickness of the liquid crystal display module i.e. the display unit 22.

Since the liquid crystal cell (LCC) is used for the display unit 22, the upper limit of a heat resistance of the liquid crystal cell is about 45° C. under a present liquid crystal technology. When the temperature exceeds the above upper limit, color-irregularities and distortion or the like are revealed on the liquid crystal display (display screen) of the display unit 22, so that bad influences due to the high temperature are revealed. On the other hand, the thin-type secondary battery 41 causes a heat generation during the charging/discharging operations. Due to this heat generation, the temperature of the thin-type secondary battery 41 is raised to a temperature level several degrees, for example, about 5° C. higher than that of the ambient atmosphere.

However, when the heat shielding plate having a thermal conductivity of at most 1 W/mK is used as the light guiding plate 47 and the reflection sheet 53 for the display device 22, it is possible to effectively and securely prevent the heat generated at the thin-type secondary battery 41 from conducting to a side of the liquid crystal cell, and also it becomes possible to effectively prevent to cause color-irregularities and distortion or the like at the liquid crystal screen of the liquid crystal display device 40.

Further, in the display unit and the mobile apparatus of the present invention, since the secondary battery is integrally combined to the display device, there is no need to separately provide a secondary battery which had been conventionally provided as a separated part. Therefore, a thickness of the display unit and the mobile apparatus can be reduced by a thickness corresponding to that of the separated secondary battery. In particular, a rod-shaped battery is arranged to a hinge portion, the PC body and the cover body are not required to provide a space having a dimension corresponding to a diameter of the rod-shaped battery, so that the effect of reducing the thickness of the unit and apparatus of the present invention can be obtained more effectively.

Further, when the display unit is used while a separated secondary battery as a separated part is remained as it is as in the conventional manner, both the separated secondary battery and the secondary battery integrally provided to the display device can be cooperatively used, it becomes possible to prolong the operation time of the display unit per one charging operation. This separated secondary battery may be provided in the PC body as the same manner as in the conventional one, or provided to the hinge portion.

A portable unit assembled with the display unit can be used as a mobile apparatus to which the display unit is integrally combined to the portable unit having at least one function of a notebook-sized thin-type personal computer, a portable telephone (cellular phone), a mobile information terminal device, a portable television (TV) image receiver, a portable navigation device, an electronic pocket book and an electronic dictionary or the like. The portable unit is not particularly limited to those having above functions as far as the portable unit is portable.

By the way, in FIGS. 8 and 9, the reference numeral 65 denotes a driving circuit substrate, the reference numeral 66 denotes a tape carrier package having a flexibility, and the reference numeral 67 denotes an IC chip mounted on the tape carrier package 66.

Although FIGS. 8 and 9 show an example of the transmission-type liquid crystal panel as the display unit 22, in a case where a reflection-type liquid crystal panel is adopted, the light guiding plate is not always necessary, and the thin-type secondary battery 41 is provided to a rear side of the liquid crystal display device 40. The liquid crystal display device 40 is integrally combined to the thin-type secondary battery 41 through the optical reflection sheet thereby to form a module structure.

In this case, it is required for the optical reflection sheet to use the heat shielding plate composed of synthetic resin material or metal material having a thermal conductivity of less than 1.5 W/mK. The optical reflection sheet as the heat shielding plate is formed to provide a thickness of 1 mm or about 2 mm or less.

In this regard, the display unit 22 shown in FIGS. 8 and 9 is one to which a basic principle of the display unit 10 according to the first embodiment is applied. However, there can be also adopted a module structure to which a basic principle of the display units 10A–10D shown in FIGS. 2 to 5 is applied.

The transmission-type liquid crystal panel or the reflection-type liquid crystal panel was used as the liquid crystal cell of the display unit 22. Then, a current-conduction performance test of the display unit 22 having a module structure was performed in a constant-temperature bath of which maximum temperature was controllable to 45° C. assuming that the display unit 22 was carried and operated under a maximum temperature of summer season or the like. In the current-conduction performance test, a rear surface side of the liquid crystal display device 40 and a front surface side of the thin-type secondary battery 41 were clamped by a thermocouple thereby to measure a rising-up temperature.

The samples of current-conduction performance test of the display unit 22 were roughly classified into the following two groups of samples.

(1) Embodiments in Case of the Transmission-Type Liquid Crystal Panel.

[Experimental Sample 1]

An optical diffusion sheet, a light guiding plate having a thermal conductivity of 0.2 W/mK, a reflection sheet and an aluminum-laminated type lithium ion secondary battery were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not caused in the liquid crystal display of the display unit.

[Experimental Sample 2]

A light guiding plate and a reflection sheet having a thermal conductivity of 0.2 W/mK and an aluminum-laminated type lithium ion secondary battery were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not revealed in the liquid crystal display of the display unit.

[Experimental Sample 3]

An optical diffusion sheet, a light guiding plate having a thermal conductivity of 0.2 W/mK, a reflection sheet and an aluminum-laminated type polymer lithium ion secondary battery were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 4]

An optical diffusion sheet, a light guiding plate having a thermal conductivity of 0.2 W/mK, a reflection sheet and an aluminum-laminated type lithium ion secondary battery accommodated in a metal-can were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not caused in the liquid crystal display of the display unit.

[Experimental Sample 5]

An optical diffusion sheet, a light guiding plate having a thermal conductivity of 0.2 W/mK and a reflection sheet were adhered to a rear surface side of a glass-transmission type liquid crystal panel as a liquid crystal display device (liquid crystal cell). Then, aluminum-laminated type lithium ion secondary battery was arranged, a heat radiating plate composed of aluminum was attached to a rear side of the secondary battery, and a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not caused in the liquid crystal display of the display unit.

[Experimental Sample 6]

An optical diffusion sheet, a light guiding plate having a thermal conductivity of 0.2 W/mK, a reflection sheet, a heat radiating plate composed of aluminum and an aluminum-laminated type lithium ion secondary battery were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 7]

An optical diffusion sheet, a light guiding plate having a thermal conductivity of 1 W/mK, a reflection sheet, a heat radiating plate composed of aluminum, an aluminum-laminated type lithium ion secondary battery and a heat radiating plate composed of copper were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 8]

An optical diffusion sheet, a light guiding plate having a thermal conductivity of 0.2 W/mK, a reflection sheet, an aluminum-laminated type lithium ion secondary battery, a heat shielding plate having a thermal conductivity of 0.2 W/mK and a heat radiating plate composed of aluminum were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 45° C. In addition, it was confirmed that any influences such as distortion and color-irregularities or the like due to the temperature was not caused in the liquid crystal display of the display unit.

[Comparative Sample 1]

An optical diffusion sheet, a light guiding plate having a thermal conductivity of 6 W/mK, a reflection sheet and an aluminum-laminated type lithium ion secondary battery were adhered to a rear surface side of a glass-transmission type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 47° C., while the temperature of the front surface of the secondary battery was 47° C. In addition, influences such as distortion and color-irregularities or the like due to the temperature were caused in the liquid crystal display of the display unit.

(2) Embodiments in Case of the Glass Reflection-Type Liquid Crystal Panel.

[Experimental Sample 1]

A reflection sheet having a thermal conductivity of 0.2 W/mK and an aluminum-laminated type lithium ion secondary battery were adhered to a rear surface side of a glass-reflection type liquid crystal panel as a liquid crystal display device (liquid crystal cell) thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not caused in the liquid crystal display of the display unit.

[Experimental Sample 2]

A reflection sheet having a thermal conductivity of 0.2 W/mK and an aluminum-laminated type polymer lithium ion secondary battery were adhered to a rear surface side of a glass-reflection type liquid crystal panel as a liquid crystal display device (liquid crystal cell) thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C. while the temperature of the front surface of the secondary battery was 48° C. In addition, any influences such as distortion and color-irregularities or the like due to the temperature was not caused in the liquid crystal display of the display unit.

[Experimental Sample 3]

A reflection sheet having a thermal conductivity of 0.2 W/mK and a lithium ion secondary battery accommodated in a metal-can were adhered to a rear surface side of a glass-reflection type liquid crystal panel as a liquid crystal display device (liquid crystal cell) thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, any influences such as distortion and color-irregularities or the like due to the temperature was not caused in the liquid crystal display of the display unit.

[Experimental Sample 4]

A reflection sheet having a thermal conductivity of 0.2 W/mK and an aluminum-laminated type lithium ion secondary battery were adhered to a rear surface side of a glass-reflection type liquid crystal panel as a liquid crystal display device (liquid crystal cell). Then, a heat radiating plate composed of aluminum was attached to a rear side of the secondary battery, and a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Experimental Sample 5]

A reflection sheet having a thermal conductivity of 0.2 W/mK, a heat radiating plate composed of aluminum and an aluminum-laminated type lithium ion secondary battery were arranged to a rear surface side of a glass-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, any influences such as distortion and color-irregularities or the like due to the temperature was not caused in the liquid crystal display of the display unit.

[Experimental Sample 6]

A reflection sheet having a thermal conductivity of 0.2 W/mK, a heat radiating plate composed of aluminum and an aluminum-laminated type lithium ion secondary battery and a heat radiating plate composed of copper were arranged to a rear surface side of a glass-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Experimental Sample 7]

A reflection sheet having a thermal conductivity of 0.2 W/mK, an aluminum-laminated type lithium ion secondary battery, a heat shielding plate having a thermal conductivity of 0.2 W/mK and a heat radiating plate composed of aluminum were arranged to a rear surface side of a glass-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Comparative Sample 1]

An optical diffusion sheet, a light guiding plate having a thermal conductivity of 6 W/mK, a reflection sheet and an aluminum-laminated type lithium ion secondary battery were arranged to a rear surface side of a glass-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 47° C., while the temperature of the front surface of the secondary battery was 47° C. In addition, influences such as distortion and color-irregularities or the like due to the temperature were caused in the liquid crystal display of the display unit.

(3) Embodiments in Case of the Plastic Reflection-Type Liquid Crystal Panel.

[Experimental Sample 1]

A reflection sheet having a thermal conductivity of 0.2 W/mK and an aluminum-laminated type lithium ion secondary battery were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 2]

A reflection sheet having a thermal conductivity of 0.2 W/mK and an aluminum-laminated type polymer lithium ion secondary battery were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 3]

A reflection sheet having a thermal conductivity of 0.2 W/mK and a lithium ion secondary battery accommodated in a metal-can were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 48° C. In addition, it was confirmed that any influences such as distortion and color-irregularities or the like due to the temperature was not caused in the liquid crystal display of the display unit.

[Experimental Sample 4]

A reflection sheet having a thermal conductivity of 0.2 W/mK and an aluminum-laminated type lithium ion secondary battery were arranged to a rear surface side of a plastic-reflection type liquid crystal panel as a liquid crystal display device (liquid crystal cell). Then, a heat radiating plate composed of aluminum was attached to a rear side of the secondary battery, and a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Experimental Sample 5]

A reflection sheet having a thermal conductivity of 0.2 W/mK, a heat radiating plate composed of aluminum and an aluminum-laminated type lithium ion secondary battery were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Experimental Sample 6]

A reflection sheet having a thermal conductivity of 0.2 W/mK, a heat radiating plate composed of aluminum and an aluminum-laminated type lithium ion secondary battery and a heat radiating plate composed of copper were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Experimental Sample 7]

A reflection sheet having a thermal conductivity of 0.2 W/mK, an aluminum-laminated type lithium ion secondary battery, a heat shielding plate having a thermal conductivity of 0.2 W/mK and a heat radiating plate composed of aluminum were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 45° C., while the temperature of the front surface of the secondary battery was 47° C. In addition, it was confirmed that any influences such as distortion and color-irregularities or the like due to the temperature was not caused in the liquid crystal display of the display unit.

[Comparative Sample 1]

An optical diffusion sheet, a light guiding plate having a thermal conductivity of 1.5 W/mK and a reflection sheet adhered to aluminum-laminated type lithium ion secondary battery were arranged to a rear surface side of a plastic-reflection type liquid crystal panel as a liquid crystal display device (liquid crystal cell). Then, a cold cathode tube as a tubular light source was arranged around the light guiding plate thereby to integrally form a display unit having a module structure. Assuming that the display unit was carried and operated under the maximum temperature, the current-conduction performance test was conducted in a constant-temperature bath of which temperature was controlled to be 45° C.

As a result, the temperature of the rear surface of the liquid crystal cell was 47° C., while the temperature of the front surface of the secondary battery was 47° C. In addition, influences such as distortion and color-irregularities or the like due to the temperature were caused in the liquid crystal display of the display unit.

Figure 11:
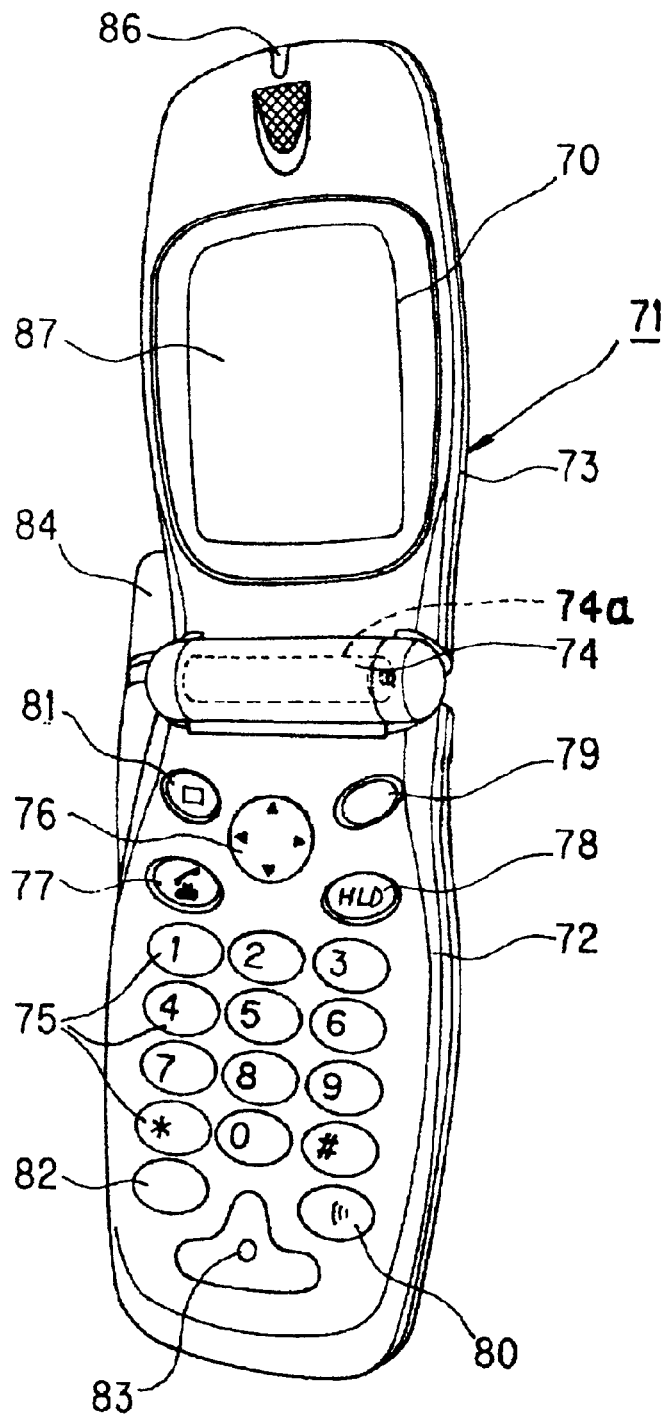
FIG. 11 is a perspective view showing an example of a portable telephone into which the display unit according to the present invention is assembled.

FIG. 11 shows an embodiment in which a display unit 70 according to the present invention is applied to a portable telephone 71.

In the portable telephone 71, a telephone body 72 and a cover body 73 are connected through a hinge 74 so that the cover body 73 is openable around the hinge 74. A rod-shaped secondary battery 74a is detachably accommodated in the hinge 74 or the telephone body 72.

The telephone body 72 is provided with dial buttons 75, a command-navigation button 76, a start button 77, a power-on/off response-retain button 78, a redial clear button 79, a voice-manner button 80, a telephone directory button 81 and a mail button 82. The reference numeral 83 denotes a voice-transmitter (telephone microphone), and an extensible antenna 84 is attached to a side portion of the telephone body 72.

Further, the cover body 73 is equipped with the display unit 70, and a telephone receiver (voice receiving port) 86 is opened to the cover body 73. The display unit 70 is formed by integrally combining the liquid crystal display device 87 as the liquid crystal cell to the thin-type secondary battery (not shown) through a heat shielding plate so as to form a module structure. A display screen of the display unit 70 can be observed when the cover body 73 is in an opened-state. In contrast, the thin-type secondary battery to be integrally assembled to a rear side of the display unit 70 is accommodated in a surface case of the cover body 73, so that the thin-type secondary battery cannot be visually observed from outside.

In this portable telephone 71, the display unit 70 is formed by integrally combining the liquid crystal display device 87 as the liquid crystal cell to the thin-type secondary battery through the heat shielding plate so as to form a module structure. Since the display unit 70 is modularized to provide a liquid crystal display module, the thin-type secondary battery can be assembled into the display unit 70. Therefore, even if the thin-type secondary battery is assembled and integrated with the cover body 73, the thickness of the cover body 73 equipped with the display unit 70 can be reduced to at most 1 cm, for example, to about several mm or less.

In this connection, although the present invention has been explained with reference to examples in which the display unit of the present invention is applied to the notebook-sized personal computer or the portable telephone, the present invention is not limited thereto. Namely, the display unit of the present invention can be also applied to mobile apparatuses in which the display unit is integrally combined to a portable unit having a function of at least one of a portable television image receiver, a portable navigation device, a mobile information terminal device, an electronic pocket book and an electronic dictionary or the like.

According to the display unit of the present invention, since the display device and the secondary battery are integrally combined to form a module structure, it becomes possible to reduce the size, weight and thickness of the display unit. In addition, even if the secondary battery is assembled into the display unit, the displaying function can be maintained in a good condition without impairing the displaying function of the display device.

Further, according to the display unit of the present invention, since the display device and the secondary battery are integrally combined through the heat shielding plate, the heat conduction from the secondary battery is shut off and prevented the heat from conducting to a side of the display device, so that it becomes possible to maintain the function of the display device. In addition, the heat shielding plate as the heat shielding layer and the secondary battery make it possible to increase the rigidity of the display unit whereby to improve the mechanical and physical strength of the display unit.

Furthermore, according to the display unit of the present invention, since the display device and the secondary battery are integrally combined through at least one heat shielding plate, it becomes possible to reduce the size, weight and thickness of the mobile apparatus equipped with the display unit. In addition, when a battery container of the secondary battery is formed to have a flexibility, a shock-absorbing function can be imparted to the secondary battery, so that a high shock-resistance can be imparted to the display unit.

Still further, according to the mobile apparatus of the present invention, since the apparatus is equipped with the display unit having a module structure in which the display device such as a liquid crystal cell or the like and the thin-type secondary battery are integrally combined, the mobile apparatus is not required to secure a space for accommodating the secondary battery. Therefore, it becomes possible to enlarge the size of the display screen of the display unit by a size corresponding to the size of the secondary battery.

In addition, when a secondary battery separately prepared from the secondary battery assembled in the display unit is accommodated in a mobile apparatus body or the hinge portion of the mobile apparatus, the secondary battery assembled in the display unit and the separated secondary battery can be commonly and cooperatively used, the operation time of the mobile apparatus can be prolonged by virtue of the combination of the built-in secondary battery and the separated secondary battery.

What is claimed is:

1. A display unit comprising:
   a display device having a display screen;
   a secondary battery disposed to a rear side of said display device; and
   a heat shielding layer interposed between said display device and the secondary battery, said heat shielding layer having a thermal conductivity of at most 5 W/mK; and
   a heat radiating layer or a cooling layer disposed to paid secondary battery at a side opposing to a side of said display device,
   wherein said display device and the secondary battery are integrally assembled to form a module structure.

2. A display unit comprising:
   a display device having a display screen;
   a secondary battery disposed to a rear side of said display device;
   a heat shielding layer interposed between said display device and the secondary battery, said heat shielding layer having a thermal conductivity of at most 5 W/mK; and
   a heat radiating layer or a cooling layer laminated with said heat shielding layer to form a laminar shape,
   wherein said display device and the secondary battery are integrally assembled to form a module structure, and
   said secondary battery includes at least one of thin lithium ion secondary battery and thin nickel metal hydride secondary battery.

3. A display unit comprising:
   a display device having a display screen;
   a secondary battery disposed to a rear side of said display device;
   a heat shielding layer interposed between said display device and the secondary battery, said heat shielding layer having a thermal conductivity of at most 5 W/mK; and a heat radiating layer or a cooling layer laminated with said heat shielding layer to form a laminar shape; and another heat radiating layer or another cooling layer provided to said secondary battery at a side opposing to a side of said display device, wherein said display device and the secondary battery are integrally assembled to form a module structure.

4. A display unit comprising:

a display device having a display screen; and a secondary battery disposed to a rear side of said display device, wherein said display device and said secondary battery are integrally adhered by means of a double coated adhesive tape as a heat shielding layer having a thermal conductivity of at most 5 W/mK, thereby to form a module structure.

5. The display unit according to any one of claims 1, 3, and 4, wherein said secondary battery includes at least one of thin lithium ion secondary battery and thin nickel metal hydride secondary battery.

6. The display unit according to any one of claims 1 to 4, wherein said display device is a liquid crystal cell having a liquid crystal panel display.

7. The display unit according to any one of claims 1 to 4, wherein said secondary battery includes at least one thin lithium ion secondary battery and thin nickel metal hydride secondary battery each having a prismatic shape and thickness of at most 10 mm, preferably a thickness of 0.5–4 mm.

8. The display unit according to any one of claims 1 to 4, wherein said heat shielding layer has a thermal conductivity of 1 W/mK or less.

9. A mobile apparatus comprising:

a display unit as defined in any one of claims 2 to 5; and a portable unit to which said display unit is integrally assembled.

10. The mobile apparatus according to claim 9, wherein said portable unit comprises a unit body and a cover body connected to said unit body through a hinge so that said cover body is openable, and said display device is mounted on said cover body while a rod-shaped battery is detachably incorporated in said hinge.

11. The mobile apparatus according to claim 9, wherein said portable unit has a function of at least one of a thin notebook-size personal computer, a portable telephone, a mobile information terminal device, a portable television image receiver, a portable navigation device, an electronic pocket book and an electronic dictionary.

* * * * *